United States Patent [11] 3,628,137

[72] Inventor Robert G. Mazur, Monroeville, Pa.
[21] Appl. No. 879,342
[22] Filed Nov. 24, 1969
[45] Patented Dec. 14, 1971
[73] Assignee Westinghouse Electric Corporation, Pittsburgh, Pa.

[54] APPARATUS FOR AUTOMATICALLY DETERMINING SPREADING RESISTANCE, RESISTIVITY AND IMPURITY CONCENTRATION IN SEMICONDUCTOR BODIES
12 Claims, 21 Drawing Figs.

[52] U.S. Cl. ................................................. 324/64, 324/158
[51] Int. Cl. ................................................. G01n 27/14
[50] Field of Search .................................... 324/62, 64, 158 F, 158 P

[56] References Cited
UNITED STATES PATENTS
3,312,893  4/1967  Currin et al. ............... 324/64
3,416,078  12/1968  Boncuk et al. ............. 324/64
3,487,301  12/1969  Gardner et al. ............ 324/64

OTHER REFERENCES
Schwartz B. and Schwartz N., Measurement Techniques for Thin Films. In The Electrochemical Society Inc., July 25, 1968, TP 250A545, pp. 258– 272.

Primary Examiner—Edward E. Kubasiewicz
Attorneys—F. Shapoe and C. L. Menzemer

ABSTRACT: Apparatus for and method of performing spreading resistance measurements on semiconductor wafers to quantitatively assess the electrical conductivity of the material of the wafer whether it be laterally on a surface to determine material homogeneity or traversely through the thickness of the wafer to obtain a profile of resistivity versus position. Means are provided in the apparatus for automatically computing the resistivity and/or the impurity concentration in the wafer from the resistance measurements obtained whereby plots of these latter parameters are made to show lateral variations in the material characteristics as well as showing the profile of resistivity and/or impurity concentration versus the distance from a reference plane of the sample.

Patented Dec. 14, 1971

Patented Dec. 14, 1971

APPARATUS FOR AUTOMATICALLY DETERMINING SPREADING RESISTANCE, RESISTIVITY AND IMPURITY CONCENTRATION IN SEMICONDUCTOR BODIES

BACKGROUND OF THE INVENTION

One of the most important control parameters in semiconductor technology is that of material resistivity. If the carrier mobility in the semiconductor material is known, a simple measurement of the semiconductor resistivity then gives direct quantitative data on the net concentration of majority carriers. For silicon, the requirement of known carrier mobility has been obviated through the publication of empirical data relating impurity concentration directly to material resistivity. That is, graphs of resistivity versus impurity concentration for P-type and N-type silicon are available. Therefore, once the resistivity is known, impurity concentration can be derived directly from the plot. These data are widely used in conjunction with resistivity measurements, both to assure knowledge of impurity concentrations in starting material and to maintain control of desired impurities introduced during device manufacture. As can be appreciated, a knowledge of impurity concentration is vital in controlling the quality of mass-produced semiconductor devices and in minimizing rejects.

Originally, resistivity measurements were made by using a four-probe technique wherein current was caused to flow through the semiconductor sample between two outer probes and the potential measured between two probes positioned between the outer two. One difficulty with the four-probe technique, however, is the limited spatial resolution normally obtained. Generally speaking, the spatial resolution of these techniques is measured in millimeters. For instance, the most commonly used small four-point probe spacing is about 0.5 millimeter. Since the current flow in a region of two or three probe spacings around the central pair of probes contributes significantly to the potential between the voltage probes, the quantitative resolution of this technique is 1 or 2 millimeters. The standard techniques may be used for high resolution of resistivity measurements under certain conditions; e.g. the four-point probe technique has been used with a sectioning procedure (such as boiling water or anodic oxidation of the silicon and subsequent dissolution of the silicon dioxide layer with HF) to measure resistivity in diffused layers with a resolution (normal to the plane of the section) measured in some tens of Angstrom units. However this requires a one-dimensional geometry in that the material being measured must still be homogeneous over millimeter distances in the plane of the section.

Some specific problems in which spatial resolution is of importance are resistivity measurements of lightly doped epitaxial layers grown on heavily doped substrates of the same conductivity type, measurements on internal layers in multilayer epitaxial or diffused structures, and the rapid evaluation 3 of actual resistivity profiles of diffused layers. Less frequently but equally troublesome problems involve initial resistivity measurements on certain materials as grown, such as whiskers or dendrites, which are either physically too small for the use of standard resistivity techniques or are normally inhomogeneous.

In response to these problems, a variety of techniques for high spatial resolution resistivity measurements have been devised. One of the best known of these is the three-point probe technique based on a measurement of the breakdown voltage of a metal semiconductor point contact, using an empirically established relationship between the measured breakdown voltage and the resistivity of the silicon. This technique, however, also has numerous disadvantages, including a limited range of conductivity and conductivity type over which it is applicable.

In order to overcome the disadvantages of such prior art techniques for determining resistivity measurements, a spreading resistance process and apparatus has been developed which consists of setting one or more probes onto the surface of a suitably prepared silicon sample and measuring the resistance associated with the resultant small area, metal semiconductor contact or contacts. The probes may be constructed of a refractory-type metal; such, for example, as osmium or the osmium-tungsten alloy known as Goldsmith M-310. If the mechanical contacting operation is carefully handled and the resistance measurements made at a bias level of a few millivolts, the resulting data, when used in conjunction with a calibration curve obtained from silicon samples of known bulk resistivity, gives a precise measure of impurity concentration in a volume of the silicon of about $10^{-10}$ cubic centimeters located immediately beneath the probes used.

A spreading resistance technique of the type described has been automated to the point where the sample is moved incrementally beneath a pair of contact members, the procedure being such that the probes are brought into contact with the sample; a resistance measurement is taken; the probes elevated; and the sample moved through an incremental distance; whereupon the cycle is repeated. Such apparatus has been devised which automatically plots the resistance measured between the probes versus position on the sample. The resistance information, however, must then be converted into resistivity values by manual computations and impurity concentration measurements then derived from a plot of impurity concentration versus resistivity. As will be appreciated, this is a tedious and time-consuming process, particularly where it is desired to take measurements on silicon samples used in the mass production of transistors and other semiconductor devices.

SUMMARY OF THE INVENTION

In accordance with the invention, there is provided apparatus for measuring the resistance between two members in contact with a semiconductive body and for computing from the resistance measurement both the resistivity and the impurity concentration in the volume of the semiconductor body beneath the small area contact or contacts. In its simplest form, this apparatus comprises means for placing a pair of spaced members or probes in contact with the surface of a semiconductor body, means for establishing a potential across the probes when in contact with the body whereby a current will flow through the body between the probes, means electrically connected to the probes for producing an analog electrical signal which varies as a function of the resistance presented to the current by the semiconductive body beneath the small area contacts, means for converting the electrical analog signal to a digital electrical signal which varies as a function of the aforesaid resistance, and means including a computer responsive to the digital signal and a program means providing electrical signals proportional to approximate resistivity and impurity concentration values for computing the actual resistivity and impurity concentration values of said semiconductive body beneath said small area contacts.

In a practical application of the invention, it is usually desired to measure the resistivity and determine the impurity concentration of a semiconductive wafer throughout the thickness thereof; which body usually incorporates at least one PN junction, but the measurements can obviously be made on bodies with no PN-junction such as Schottley barrier devices. For this purpose, the wafer of semiconductive material, containing one or more PN junctions, is lapped at an angle to expose the interior of the structure for contact by the spaced probes. In order to provide a resistivity and impurity concentration profile, the sample is moved in increments beneath the probes which are brought down into engagement with the semiconductor body the measurement is made, and then the probes are elevated off the body; whereupon the body is moved through an incremental distance to a new point for contact by the probes. In this manner, a succession of resistance measurements are taken, and a succession of resistivity and impurity concentration calculations made. These successive readings can then be recorded by means of X–Y recorders to produce plots of resistance, resistivity and impurity concentrations versus depth in the semiconductive body as measured from one surface thereof.

Figures 1, 1A, 3:
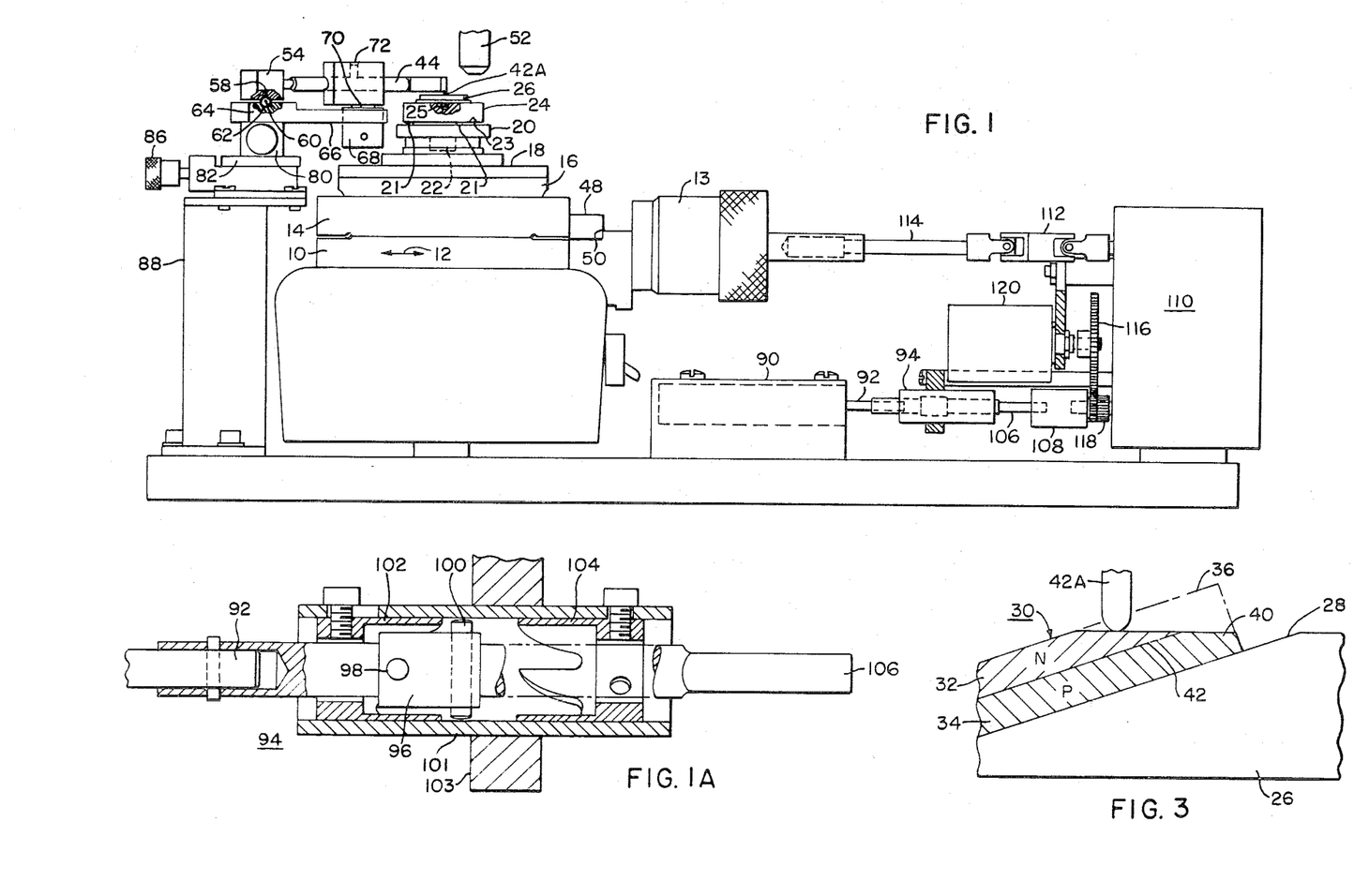
FIG. 1 is an elevational plan view of the automatic spreading resistance probe assembly of the present invention.
FIG. 1A is an enlarged cross-sectional view of the incremental motion device employed in the probe assembly of FIG. 1.
FIG. 3 is an enlarged cross-sectional view of a sample of semiconductive material which has been lapped for engagement by the probes shown in FIGS. 1 and 2.

With reference now to the drawings, there is illustrated a preferred embodiment of the invention, and particularly in FIG. 1 an overall view of probes and associated apparatus handling a semiconductor body being tested. There is shown a component of the probe apparatus comprising the lower portion of a toolmaker's microscope which comprises a first platen 10 movable in the direction of the arrows 12 by means of a micrometer screw assembly 13. Mounted on the platen 10 is a second platen 14 movable into and out of the plane of the drawing by suitable means, not shown, comprising another micrometer screw. Carried on top of the platen 14 is a first circular rotatable plate 16; while above the plate 16 is a circular mounting plate 18 having a threaded opening which receives the threaded shank portion of a screw 20 provided with a flanged portion for manual adjustment. The upper surface of the screw 20 is provided with three indentations which receive three sapphire balls 21, only two of which are shown in FIG. 1. These sapphire balls 21, in turn, are received within three radial V-grooves 23, perhaps best shown in FIG. 7, formed in the lower surface of a circular steel plate 24. Also carried in the upper surface of the screw 20 is a magnet, not shown, which attracts the steel plate 24 and thereby holds it securely in engagement with the sapphire balls 21. The balls 21 serve to electrically insulate the semiconductor body such as a silicon sample being tested, from the remainder of the microscope and also serve to rigidly support the plate 24 in a kinematic six-point constraint system not allowing rocking or any other motion of plate 24 during the measurement process.

Figure 7:
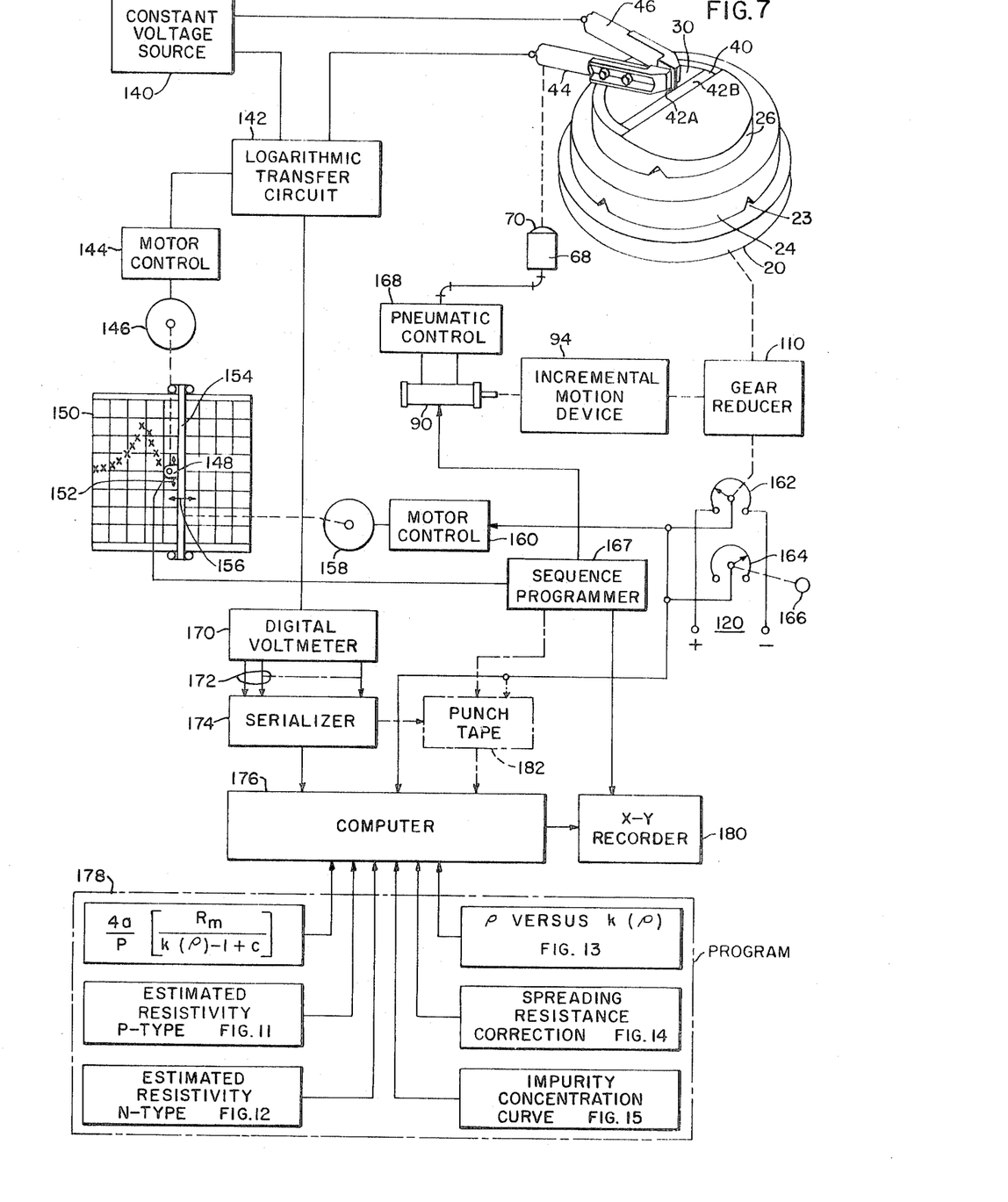
FIG. 7 is a block diagram of the electrical apparatus of the invention for producing electrical signals proportional to resistance, resistivity and dopant concentration and for recording the values for resistance, resistivity and dopant concentration on X-Y recorders.

The upper surface of the circular plate 24 is provided with a counterbored opening 25 which receives a screw projecting upwardly into a lapping jig 26, perhaps best shown in FIGS. 3 and 7. The lapping jig 26 includes an upper beveled surface 28 (FIG. 3) to which a silicon sample 30 is attached, to do so it can be waxed, clamped or soldered. The sample 30 includes as an example, an upper N-type region 32 and a lower P-type region 34 separated by a PN-junction 42. Before lapping, the cross section of the sample 30 is generally rectangular in shape as indicated by the broken line 36. However, when the sample is mounted on the surface 28 and lapped, a horizontal lapped surface 40 results having a P-type portion and an N-type portion separated by the PN-junction 42.

Figure 4:
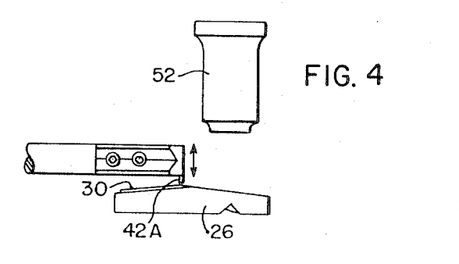
FIG. 4 is a side view showing the relationship of a sample of semiconductive material with respect to the testing probes of the invention.
Figure 5:
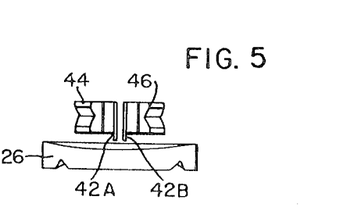
FIG. 5 is an end view of the apparatus shown in FIG. 4.

In order to perform spreading resistance measurements, the PN-junction must be aligned substantially parallel to a line extending between a pair of spaced members or probes 42A and 42B, perhaps best shown in FIGS. 4 and 5. This arrangement enables one to make a measurement at two separate places at substantially the same distance from an initial reference plane, usually the top surface of the sample 30. The members or probes 42A and 42B are secured, preferably by welding, to the ends of the two spaced probe arms 44 and 46. The tips of these members or probes are formed from an electrically conductive refractory-type metal such, for example as an alloy of osmium and tungsten, which metals have the highest values of Young's modulus of any elemental materials. Thus, sufficient force may be applied to the members or probes to achieve intimate metal-semiconductor contact, irrespective of surface insulating layers, and a well-reproduced geometry without damaging the probe itself. In the case of the osmium alloy probes used, the stress on the metal is elastic only, at least after a conditioning process in practice involving the making of approximately 15,000 measurements. The tips of the probes are approximately spherical an are polished with a radius of curvature of about 0.001 inch. The probes have a shank diameter of 0.020 to 0.028 inch and an included angle of about 50° or more at the probe tip. When contact with the silicon sample is made properly with no lateral dragging, such probes will last indefinitely. Furthermore, because of the large shank diameter and blunt angle from shank to tip, the probes have considerable structural integrity and are not affected by the applied forces used to avoid trouble from insulating or tarnished layers.

As was explained above, the two spaced probes 42A and 42B should be substantially aligned parallel to the line of intersection of the PN-junction 42 and the lapped surface 40 as shown in FIG. 3. Furthermore, the sample 30 must be elevated to that the lapped surface 40 is at a prescribed position with relation to the probes 42A and 42B. This is accomplished by the operator rotating the screw 20 until the sample comes into sharp focus when viewed through the microscope objective 52. At this point, it is known that the sample is at the prescribed height. This is because the focal point of the microscope objective used is maintained fixed through the use of a mechanical stop on the microscope mount. If it should happen that the PN-junction of the sample, when it reaches the correct height, is not aligned with the two probes 42A and 42B, the plate 16 may be rotated to bring it into alignment without moving the sample jig 26 upwardly or downwardly. Initially, when the sample on the lapping jig 26 is placed on the plate 24, a gauge block 48 is removed from between the platen 14 and a shoulder 50. The platen 14 is spring loaded such that it will move to the right as viewed in FIG. 1. In this process, the sample jig 26 with the sample thereon moves beneath the microscope 52 (FIG. 4) for the height adjustment procedure described above.

With the height adjusted and the PN-junction now in proper alignment with the two probes 42A and 42B, the platen 14 is moved to the left and the gauge block 48 is reinserted into the position shown in FIG. 1, thereby moving the sample jig 26 to the left and beneath the two probes 42A and 42B which are now elevated above the sample 30. The width of the gauge block 48 is identical to the distance between the line joining the probes 42A and 42B and the axis of the microscope 52. Therefore, when the gauge block 48 is reinserted into the position shown in FIG. 1, one of the probes 42A and 42B will be exactly above the point focused on by the microscope 52. In actual practice, and with reference to FIG. 3, this point will usually be the left end of the lapped surface 40. In a succeeding testing process, the probes 42A and 42B are brought down into engagement with the lapped surface 40; a measurement taken; the probes 42A and 42B raised; and the platen 14, jig 26 and sample 30 then moved in incremental steps to the left with the probes being brought down into contact with the surface 40 after each increment of movement.

Figure 2:
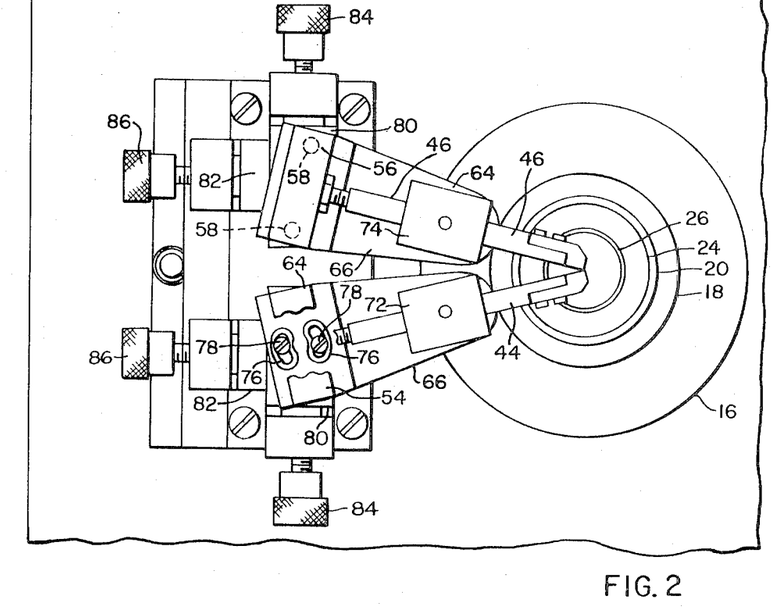
FIG. 2 is a top view of the automatic spreading resistance probe assembly of FIG. 1 showing the arrangement of the probes themselves.

With specific reference now to FIGS. 1 and 2, the probe arms 44 and 46, at their ends opposite the probes 42A and 42B, are carried in blocks 54 and 56. Formed in the lower surfaces of the blocks 54 and 56 are spaced indentations 58 which fit over sapphire balls or spheres 60 resting in spherical cup-shaped depressions 62 formed in a lower supporting member 64. In this manner, it can be seen that the block 54 and the probe arm 44, for example, can freely pivot about the balls 60 either upwardly or downwardly. The member 64 for each of the probe arms 44 and 46 is provided with an arm or extension 66 which carries, at its outer end, an air chamber 68 having an upper open end fitted with a silicone rubber or the like diaphragm 70. In this manner, and assuming that air under pressure is admitted into the chambers 68, the diaphragm, in turn, engages a weight 72 or 74 carried on the arm 44 or 46, respectively. Thus, with no air under pressure admitted to the chambers 68, the weight 72 will cause the arm 44, for example, to rotate in a downward direction, thereby bringing the probe 42A in engagement with a sample 30 on the jig 26. However, when air under pressure is admitted to the chambers 68, the diaphragm 70 inflates, thereby forcing the weight 72 and the arm 44 upwardly. The diaphragm 70 beneath the weight 74 for arm 46 operates in the same manner. As will be seen, both of the chambers 68 for the arms 44 and 46 are operated in unison such that both arms 44 and 46 are moved upwardly and downwardly together. The rate of descent is controlled by a calibrated leak from the chambers 68 through which the trapped air in chambers 68 flows when the air supply to these chambers is closed.

Assuming that the weight of member 72 or 74 is sufficient to cause a force of about 50 grams at the ends of the arms 44 or 46, the average pressure over the contact interface with the probes down is about $10^6$ pounds per square inch. This assures good electrical contact with the sample regardless of oxide layers or the like. Such pressures cannot be instantaneously generated without excessively damaging the contacts or probes. This is prevented by the diaphragms 70. When supplied with a few pounds per square inch pressure, the diaphragms expand like balloons to lift the probes 42A and 42B off the sample surface. With the air inlet closed, a needle valve of restricted orifice allows the escape of trapped air at a controlled rate, with resultant gentle lowering of the probes. This assures a constant and well-controlled rate of descent of the probes and, because of the resiliency of the diaphragms 70, a gradual buildup of the pressure at the metal-semiconductor contact.

With reference to FIG. 2, the member 64 for arm 44, for example, is provided with a pair of arcuate openings 76 through which screws 78 extend. These screws are threaded into a platen 80 mounted for reciprocating movement on a lower platen 82. The platen 80 may be reciprocated back and forth by means of thumbscrews 84 (FIG. 2) and, similarly, the platens 82 may be reciprocated back and forth by means of thumbscrews 86. The angular positions of the extensions 66 in the plane of the drawing of FIG. 2 may be adjusted by loosening the screws 78 and rotating the members 64. In this manner, it can be seen that the probes 42A and 42B may be exactly positioned with respect to a sample being tested. The platen 82 is carried on a stand 88 adjacent to the platens 10 and 14 as shown in FIG. 1.

As was mentioned above, the operation of the equipment is such that the sample jig 26 and the sample 30 mounted thereon move in increments beneath the probes 42A and 42B, the probes being elevated by means of the pneumatic chambers 68 during each increment of movement. The incremental movement is effected through the micrometer screw assembly 13 by means including a pneumatic cylinder 90 (FIG. 1) having a piston rod 92 connected to an incremental motion device 94. The details of the incremental motion device are shown in FIG. 1A. The piston rod 92 is connected to a shuttle 96 having two pins 98 and 100 extending therethrough with the pins at right angles to each other. These pins engage two opposed sets of cylindrical sawteeth 102 and 104 such that, on the forward stroke, the front pin 100 engages the front set of sawteeth 104 and rotates the shuttle 96 and a shaft 106 connected thereto through 45° in a clockwise direction. On the return stroke, the rear pin 98 engages the rear set of sawteeth 102 so as to rotate the shuttle another 45° in the same direction as on the forward stroke. Thus, the air cylinder piston translation is converted into a combined translation and a 90° rotation of the shuttle 96 and shaft 106. The sawteeth 102 and 104 are carried at opposite ends of a cylinder 101 secured against rotation by means of a mounting plate 103.

With reference again to FIG. 1, the shaft 106 is connected through coupling 108 to a gear reducer 110. The output shaft of the gear reducer is coupled through a universal joint 112 and shaft 114 to the micrometer screw assembly 13 for the platen 10. In this way, the sample 30 may be moved under the stationary spreading resistance probes 42A and 42B in increments or steps. One important advantage of the incremental motion device is that there is no long term drift. That is, the motion is essentially digital and each four actuations must rotate the shuttle and the shaft 106 through exactly 360°. Another important advantage of this incremental device is that it is completely at rest during the probe measurement part of the cycle and, therefore, does not vibrate the probes during measurement. The air cylinder 90 also acts as a torque-limiting device, eliminating the need for a clutch mechanism.

The input shaft of the speed reducer 110 is connected through gears 116 and 118 to a potentiometer 120 which is used in a manner hereinafter described to determine the position of the sample 30 beneath the stationary probes 42A and 42B.

Figure 6:
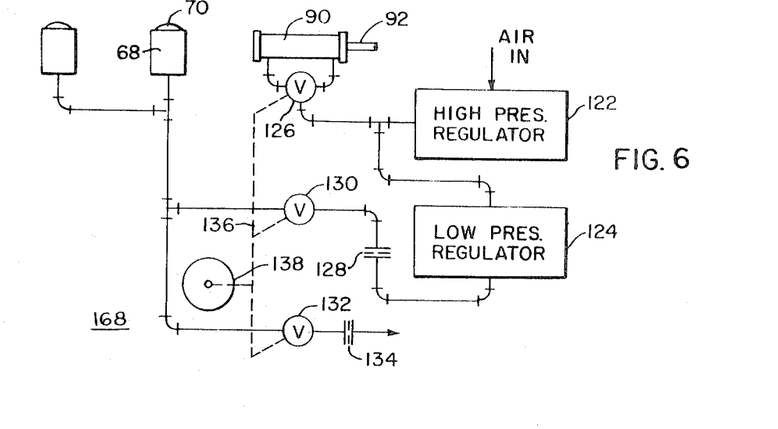
FIG. 6 is a schematic diagram of the pneumatic actuating mechanism for the apparatus of FIGS. 1 and 2.

With reference now to FIG. 6, showing the pneumatic control circuit 168 (FIG. 7) the control for the chambers 68 which elevate the probes 42A and 42B and the control for the cylinder 90 are shown. Air under pressure is passed through a high-pressure regulator 122 o a low-pressure regulator 124. From the high-pressure regulator, air under pressure is adapted to pass through valve 126 into either the forward or rear end of the cylinder 90, thereby causing the piston rod 92 to move o the left or right, depending upon the orientation of the valve 126. From the low-pressure regulator 124, the air passes through an adjustable restricted orifice 128 to a valve 130 which, when opened, will admit air into the chambers 68 and inflate the rubber diaphragms 70 to elevate the probes 42A and 42B. However, with valve 130 closed and valve 132 opened, the air will pass out of the chambers 68, through the valve 132 and a variable restricted orifice 134 to the atmosphere.

The valves 126, 130 and 132 are controlled by means of cams schematically illustrated at 136 and driven by means of a synchronous motor 138. During cycle of operation, the valve 130 is opened first, thereby admitting air under pressure to the chambers 68 to inflate the diaphragms 70 and elevate the probes 42A and 42B. Following this action, the valve 126 is actuated to admit air under pressure to the left side of the cylinder 90 as viewed in FIG. 6, thereby forcing the piston rod 92 to the right. Immediately thereafter, the valve 126 is reversed, causing the piston rod 92 to move back to its original position. In this process, the shaft 106 (FIG. 1) is caused to rotate through 90° by the incremental motion device 94 as was explained above Rotation of the shaft 106, through gear reducer 110, causes the shaft 114 to rotate also, thereby moving the platen 10, the sample jig 26 and the sample 30 to the left as viewed in FIG. 1 through one increment.

Following this, the valve 130 is closed and the valve 132 is opened, whereby the air within the chambers 68 bleeds out through the restricted orifice 134, the rate of descent of the probes 42A and 42B being controlled by the variable restricted orifice 134. In the operation of the system, air pressure of about 6 pounds per square inch causes the rubber diaphragms 70 to exert a force on the underside of each weight 72 or 74, lifting the probes off the sample 30. In order to lower the probes onto the sample, the air valve 132 is opened and the air trapped in the chambers escapes through the restricted orifice 134, causing the probes 42A and 42B to be lowered slowly and gently onto the sample surface. If desired, after the probes are down, a second cam-controlled valve can be provided for bypassing the restricted orifice 134 to permit all of the remaining trapped air in the chambers 68 to be dumped to the atmosphere. This insures that the diaphragms are not in contact with the probes during the resistance measurement.

With reference now to FIG. 7, the probe arms 44 and 46 are connected to a constant-voltage source 140 characteristically of about 10 millivolts. The current between the probes 42A and 42B is then measured by a logarithmic transfer circuit 142 which provides an output voltage proportional to the logarithm of the current flowing between the probes 42A and 42B. Since the voltage across the probes is constant, the output voltage of the logarithmic transfer circuit is also proportional to the logarithm of the resistance between the probes.

The logarithmic transfer circuit may be of the type described by J. F. Gibbons and H. S. Horn in *IEE Transactions of the Circuit Theory Group*, Vol. CI-11, No. 3, Sept. 1964. Basically, the logarithmic transfer function occurs by virtue of the fact that the short circuit collector current of many silicon transistors is proportional to the exponential of the emitter-base voltage over about 9 decades of collector current. Such a transistor may be connected as a three-terminal feedback network in an operational amplifier to obtain accurate logarithmic transfer response over a dynamic voltage of nine decades.

The logarithmic output of the circuit 142 is applied to a motor control circuit 144 which, in turn, controls a servomotor 146 connected to a pen 148 on an X–Y recorder 150 That is, the motor 146 is adapted to move the pen upwardly or downwardly along the direction of arrow 152, the pen being carried on a crossbar 154 adapted to move along the direction of arrow 156 at right angles to the direction of the movement of the pen 148. The crossbar 154 is connected to a second servomotor 158 controlled by motor control circuit 160. The motor control circuit 160, in turn, is connected to a movable tap on a rheostat 162 which forms part of the potentiometer assembly 120 shown in FIG. 1 and connected to the shaft 106 through gears 116 and 118. As the shaft 106 rotates, so also does the movable tap on rheostat 162, thereby causing the motor control circuit 160 to actuate motor 158 to move the bar 154 to the right or left in accordance with the incremental movement of the probes across the silicon sample 30. Parallel with the rheostat 162 is a second rheostat 164 provided with a knob 166 which may be manually adjusted to balance the output of the rheostat 162 whereby the output to the motor control circuit 160 is zero. In this manner, the crossbar 154 may be positioned to start recordings from any point along the X-dimension of the X-Y recorder, regardless of the position of the micrometer screw assembly 13 or the position of rheostat 162.

The pen 148 is actuated to print a mark on graph paper placed on the X-Y recorder 150 by means of a sequence programmer 167, which also controls the pneumatic control circuit 168 described in detail in FIG. 6. The operation of the sequence programmer 167 is such that when the pneumatic control circuit bleeds air from the chambers 68 to lower the probes 42A and 42B onto the silicon sample and current flows between the probes, the sequence programmer 167 also actuates the pen 148 to print a mark on the graph paper of the X–Y recorder. By this time, however, the motor 146 will have positioned the pen for the correct resistance value along the bar 154; and the motor 158 will have moved the bar 154 to a position corresponding to the position of the probes on the lapped surface 40 shown in FIG. 3.

Figure 8:
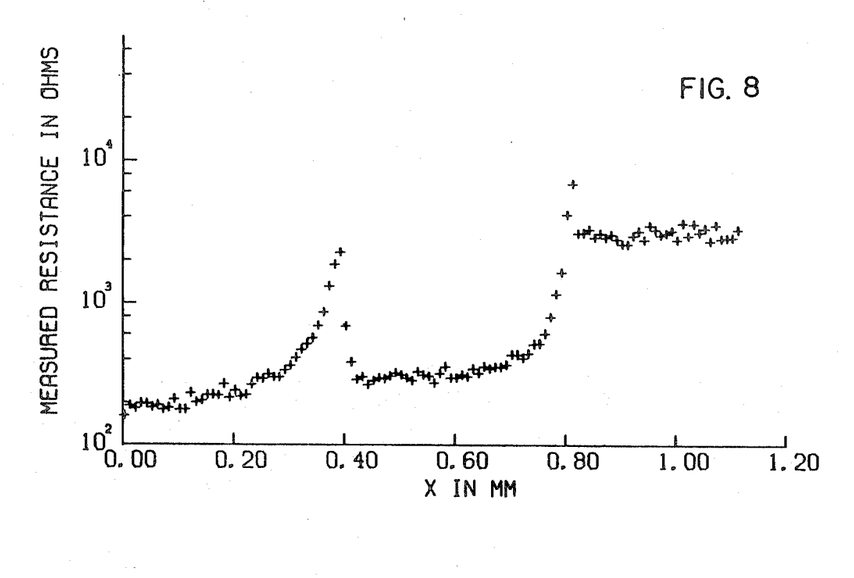
FIG. 8 is a plot of resistance versus sample depth obtained with the apparatus of the invention.

The resulting graph produced by the X-Y recorder 150 may appear as that shown in FIG. 8 wherein measured resistance in ohms, on a logarithmic scale, is plotted against position along the lapped surface 40. Note that the resistance is relatively constant until the position along the beveled surface reaches about 0.20 millimeter and then increases rapidly, indicating the existence of a PN-junction junction at approximately PN-junction millimeter. Thereafter, the resistance decreases and remains constant until a second PN-junction junction is reached at a position of about 0.80 millimeters. Thereafter, the resistance is relatively high, on the order of $4 \times 10^3$ ohms.

The output voltage of the logarithmic transfer circuit, proportional to the logarithm of the resistance in ohms, is also applied to a digital voltmeter 170 shown in FIG. 7. The digital voltmeter produces ON or OFF input signals on leads 172 comprising bits in a binary number having a value equal to the logarithmic value of the resistance output of circuit 142. These bits are then "read" serially by means of a serializer circuit 174 and applied to a computer 176. The function of the computer 176 is to convert the resistance readings at the output of circuit 142 into resistivity and net impurity concentration readings.

It is known that the resistivity of a silicon sample may be determined from the following equation:

$$\rho = \frac{4a}{P} \left[ \frac{R_m}{k(\rho) - \left(1 + \frac{c}{2}\right)} \right] \quad (1)$$

where:
$\rho$ = resistivity in ohm-centimeters;
$a$ = radius of the probe contact;
$P$ = the number of probes (two in the embodiment shown);
$R_m$ = measured resistance;
$k$ = a parameter dependent upon calibration data; and
$c$ = a thickness correction factor.

Figure 11:
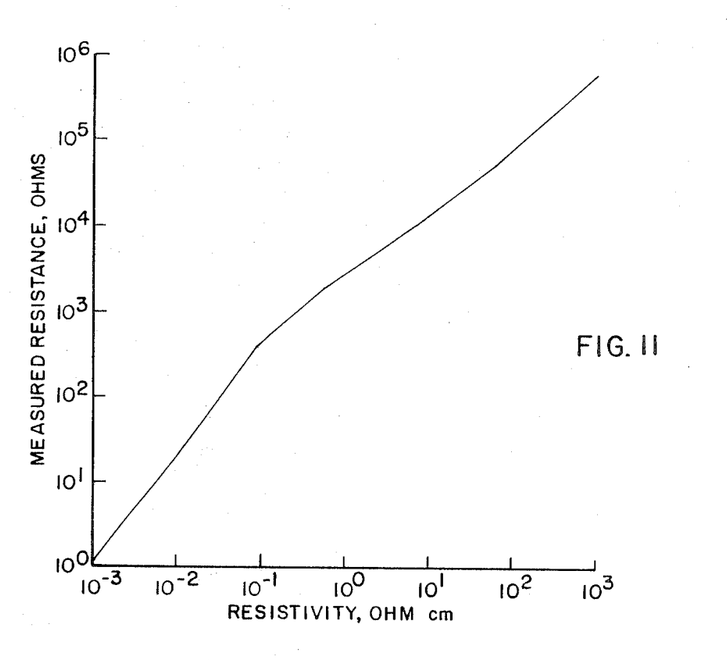
FIG. 11 is a plot of resistivity versus resistance for N-type silicon material used in the computation of resistivity in accordance with the invention.
Figure 12:
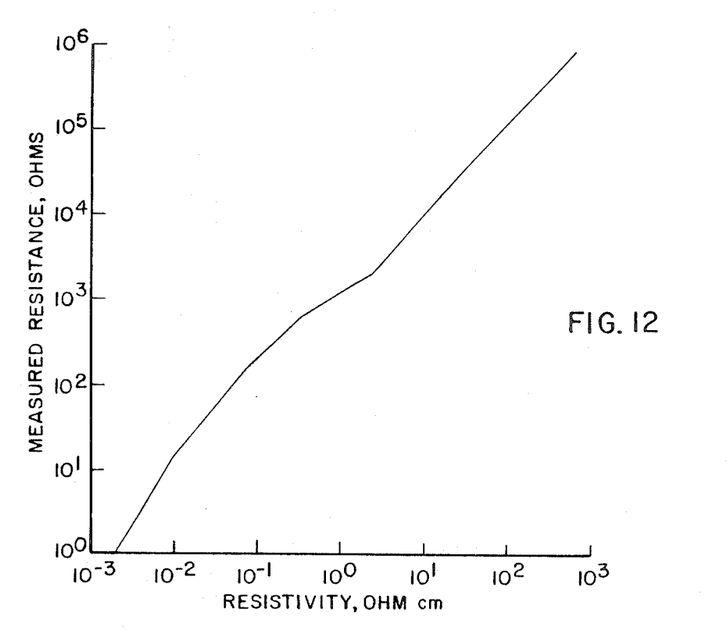
FIG. 12 is a plot of resistivity versus resistance for P-type silicon material used in the computation of resistivity in accordance with the teachings of the invention.
Figure 13:
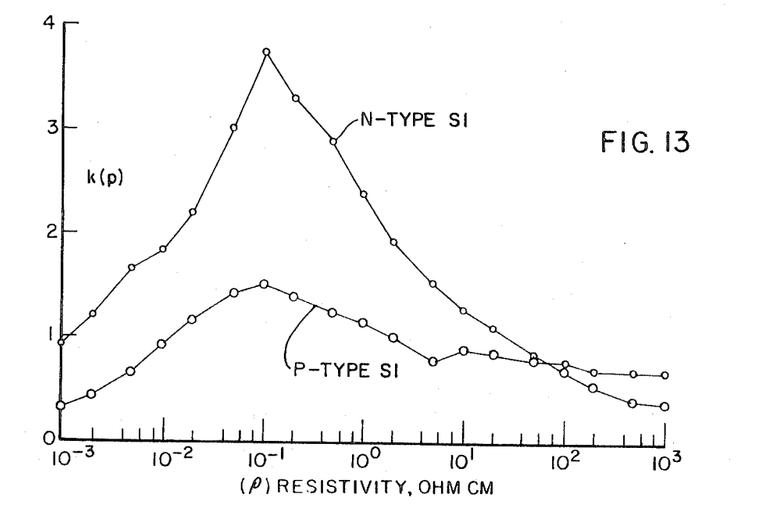
FIG. 13 is a plot of an empirically derived parameter "$k$", which is a function of resistivity, utilized in the computation of resistivity in accordance with the invention.
Figure 14:
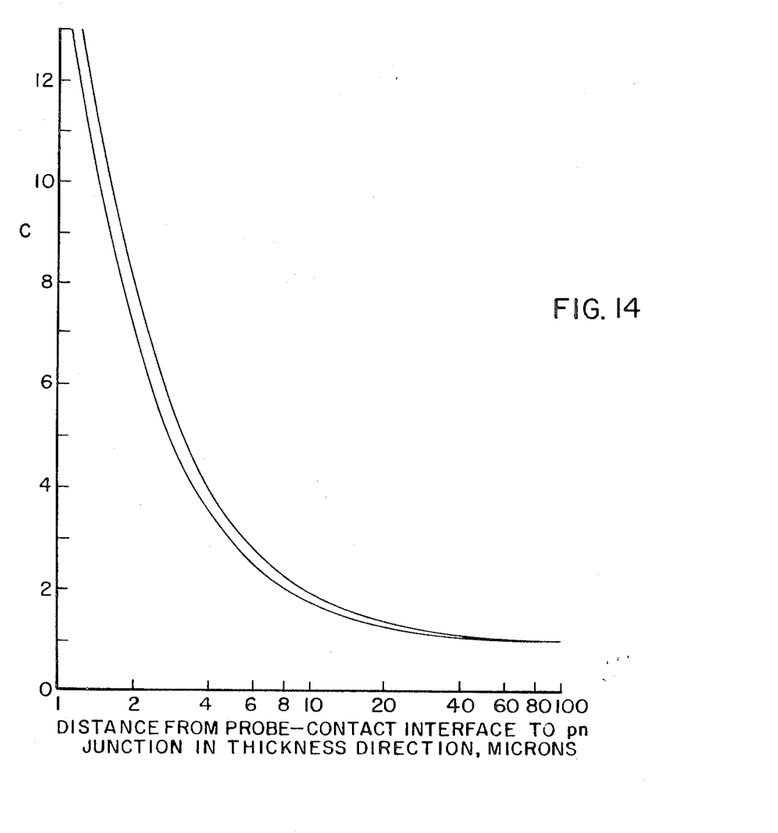
FIG. 14 is a plot of spreading thickness correction factor versus distance from the probe-contact interface to a PN-junction or other insulating boundary below the probed surface utilized in the computation of resistivity in accordance with the invention.

In the foregoing equation, the contact radius $a$, the probe factor number $P$ and the measured resistance $R_m$ are known. The correction factor $c$ is determined as indicated below. This however, leaves two unknowns, namely, the resistivity $\rho$ and the factor $k(\rho)$. The equation, however, may be solved by the computer 176 by the method of successive approximations using the empirical relation between $k(\rho)$ and $\rho$ graphed in FIG. 13 which data is obtained from solutions of the equation (1), using measurements on sets of samples of known resistivity. Rapid solution of the equation (1) by the computer is favored by the fact that as $\rho$ varies over 6 orders of magnitude, $k(\rho)$ varies by less than a factor of 5. A first approximation $\rho_a$ to the local resistivity corresponding to an individual spreading measurement is obtained by the computer from data comprising the graph shown in FIGS. 11 and 12 (FIG. 11 is for N-type material, and FIG. 12 is for P-type material). This value is used by the computer 176 to determine a first approximation to $k(\rho)$ from the $k(\rho)$ versus $\rho$ curve shown in FIG. 13. This value can be called $k_1(\rho)$. Then, a value for the thickness correction factor, $c$, is obtained from data comprising the graph shown in FIG. 14, the value of $c$ being a constant depending only on the position of the particular measurement point above the PN-junction. The known values of all parameters including $k_1(\rho)$ are then substituted into the foregoing equation and the equation is solved for $\rho$, yielding a reasonable first approximation to the true local resistivity, which can be denoted as $\rho_1'\rho_1$ can be used to get a second value $k_2(\rho)$ from the empirical relation between $k(\rho)$ and shown in FIG. 13, and the equation again solved by the computer 176 for a closer approach to the true resistivity. This process is continued until no significant difference in successive values is observed. Because of the gradual change of $k(\rho)$ with $\rho$, the number of iterations need never be large. Usually two or three will suffice.

Figure 15:
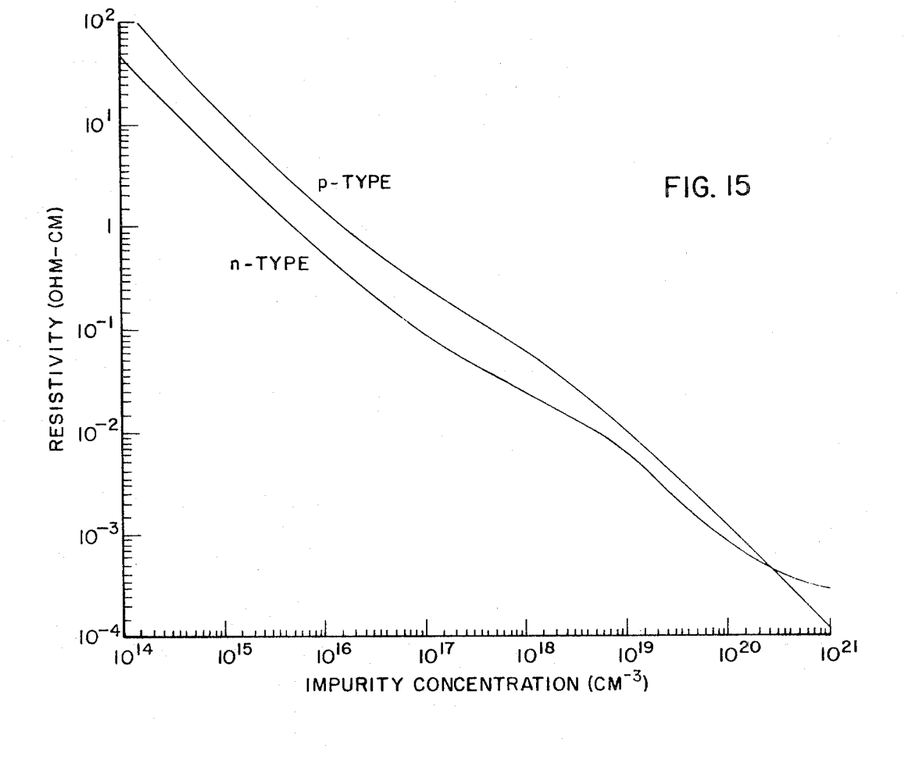
FIG. 15 is a plot of resistivity versus impurity concentration obtained from empirical data and utilized in the computation of impurity concentration in accordance with the teachings of the invention.

Once the resistivity $\rho$ is determined, impurity concentration can be determined directly from data comprising the graph of FIG. 15 which is a plot of resistivity versus impurity concentration for P-type and N-type silicon.

Thus, the program 178 or information fed into the computer, in addition to the foregoing equation, includes the data from the graphs of FIGS. 11–15. If it is initially assumed that the probes are contacting P-type silicon, the computer is apprised of the fact that a transition to N-type silicon occurs when the resistance rises and then abruptly falls as shown in FIG. 8. The same is true when a transition from N-type to P-type is sensed in the same manner.

Figure 9:
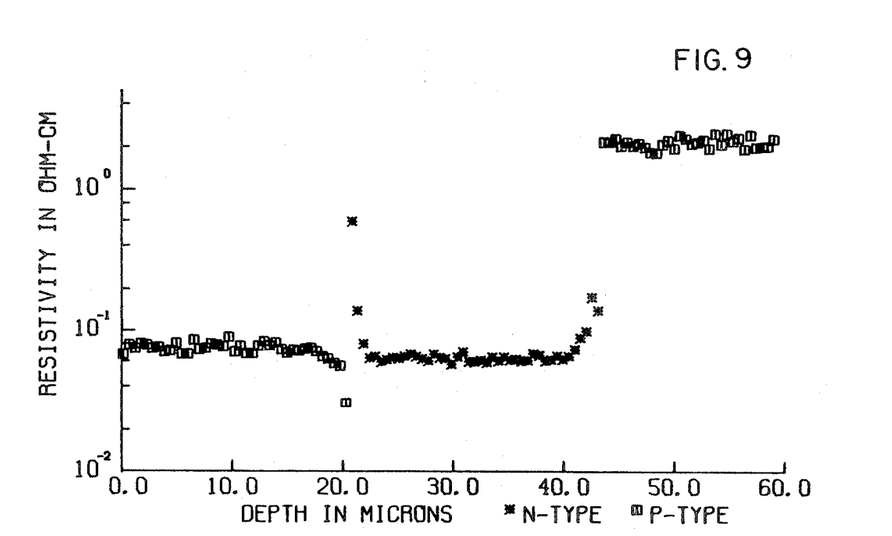
FIG. 9 is a plot of resistivity versus sample depth obtained with the apparatus of the invention.
Figure 10:
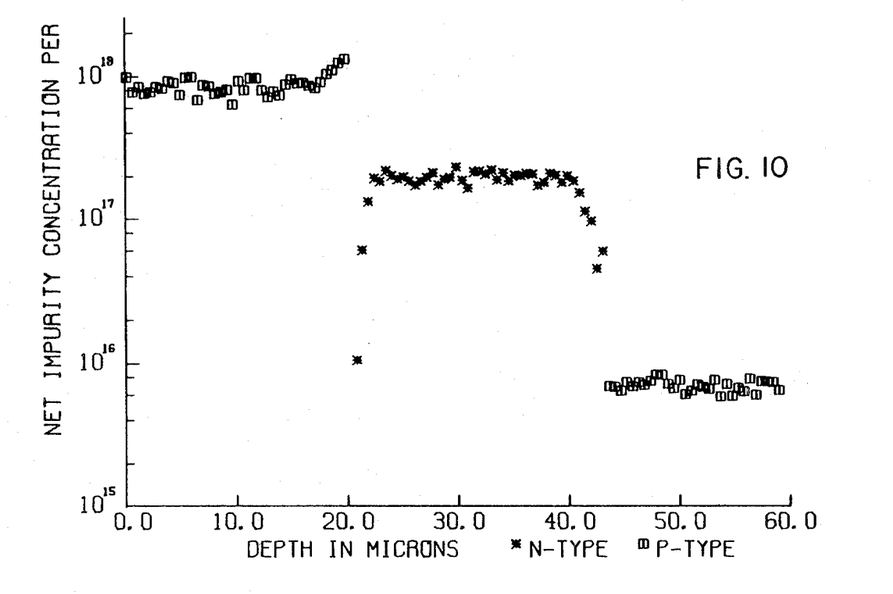
FIG. 10 is a plot of impurity concentration versus depth of the sample obtained with the apparatus of the invention.

The resistivity values computed by the computer 176 are then applied to an X-Y recorder 180, or to a digital plotter, not shown, which records resistivity versus depth (FIG. 9) and impurity concentration versus depth (FIG. 10). As will be appreciated, the computer 176 can compute resistivity and impurity concentration very rapidly and can easily follow movement of the probes 42A and 42B over the sample. The output of the rheostat 162 is also connected through the computer 176 to the X-Y recorder 180 or to the digital plotter, if employed whereby the pen of the recorder or plotter will follow the depth of the sample.

In most cases, it is impractical to tie up an entire computer as shown in FIG. 7. Accordingly, the readings of the digital voltmeter and the rheostat 162 are fed to a punch tape, schematically illustrated at 182 in FIG. 7, and the information for a number of samples subsequently fed into the computer 176.

The apparatus as described is suitable for determining the homogeneity or lateral variation of semiconductor materials either on the top or the bottom surfaces of a sample or on a prepared surface of the sample which is parallel to the top and bottom surfaces, one of the surfaces being removed to prepare the material sample. The material sample may also be examined in the same manner as described heretofore for the sample 30 to determine the homogeneity of the material through the thickness of the sample being investigated. In the same manner the apparatus is suitable for investigating the resistivity characteristics of semiconductor materials wherein two regions of the same type semiconductivity is in abutting contact with each other and each region having a different level of impurity concentration whereby a step in the homogeneity of the material is present.

Other alternate embodiments of the teachings of this invention also employ the measurement procedure described heretofore, but only a single probe and a large area ohmic electrical contact affixed to a surface of the sample 30 are needed to perform the spreading resistance measurements. The large area ohmic electrical contact may be formed by suitable plating, alloying, or fusing techniques.

Figure 16:
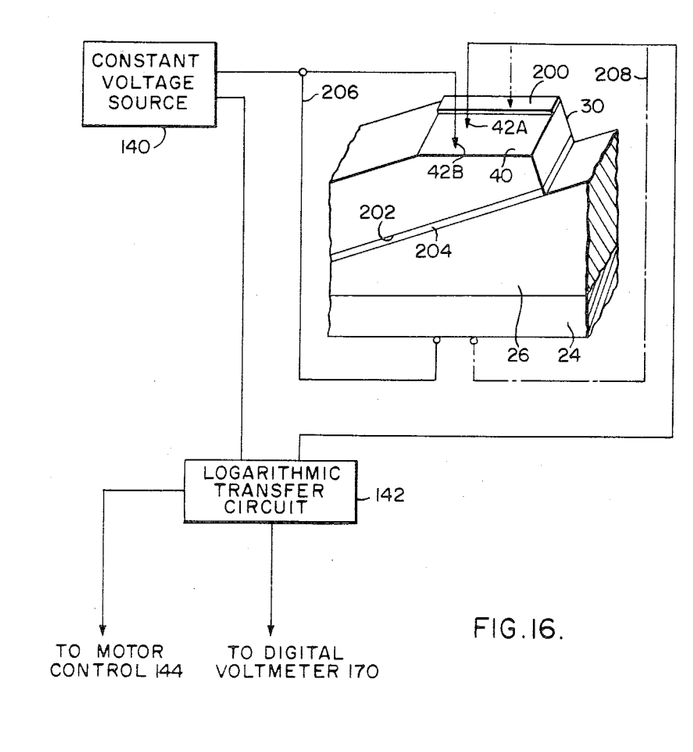
FIGS. 16 through 20 are schematic views of alternate embodiments of the apparatus of FIG. 1 illustrating various contacting and probe area configurations.

Referring now to FIG. 16, there is shown a schematic diagram depicting the alternate embodiments of the teachings of this invention. The constant-voltage source 140, the logarithmic transfer circuit 142, the motor control 144 and subsequent circuitry, the digital voltmeter and subsequent circuitry and the probes 42A and 42B and their associated hardware and control circuitry are exactly the same and act in the same manner as previously described in this specification.

The sample having none or one or more PN-junctions contained therein to be probed has an electrical contact 200, preferably a large area ohmic electrical contact, suitably affixed to one or more surfaces of the sample surface e.g., the edge of the beveled surface 40. As another example, the sample 30 to be probed may be affixed to the lapping jig end piece 26 by a layer 204 of an electrically conductive adhesive such, for example, as or by ultrasonic soldering techniques and the like. The lapping jig end piece 26 acting as an electrical contact to the sample 30. The lapping jig end piece 26 is joined to the sample mounting block 24 (FIG. 1) providing a metal-to-metal electrical connection between the sample mounting block 24 and the lapping jig end piece 26. An electrical connection is then made to the sample mounting block 24 through one of several peripheral tapped holes contained therein. This type of electrical circuit arrangement provides a means for electrically short circuiting either of the probes 42A or 42B. The probe which is electrically short circuited need not be removed from the apparatus. However, the probe which is electrically short circuited is generally removed to prevent accidental damaging of the probe, the sample 30, or both and the previously described procedure is followed in its entirety, the result being a spreading resistance plot of the resistance associated with the single probe contact employed.

In this alternate embodiment of the teachings of this invention, the probe 42B may, for example, be electrically short circuited by providing a jumper lead 206 between the electrical lead to the probe 42B to the mounting block 24 by which an electrical circuit is provided through the block 24 to the lapping jig end piece 26, with the layer 204 of electrically conductive adhesive to the bottom surface 202 of the sample 30 employed to provide the necessary electrical path for a current flowing between the probe 42A and the piece 26 to be measured by the logarithmic transfer circuit 142.

The probe 42A is electrically short circuited by omitting the jumper lead 206 and providing a jumper lead 208 either between the block 24, or between a metal contact 200 on the lapped bevel surface 40, and the lead from the probe 42A to the logarithmic transfer circuit 142. In a similar manner as that described for the jumper lead 206, the current flowing between the probe 42B and the piece 26 or the contact 200 is measured by the logarithmic transfer circuit 142.

Should the sample 30 be the same as the one which produced the spreading resistance curve of FIG. 8, the curve plotted in this instance conforms to that of FIG. 8 but is only reduced in magnitude by about one-half. This can be compensated for by adjusting the factor P in the computer portion.

Figure 17:
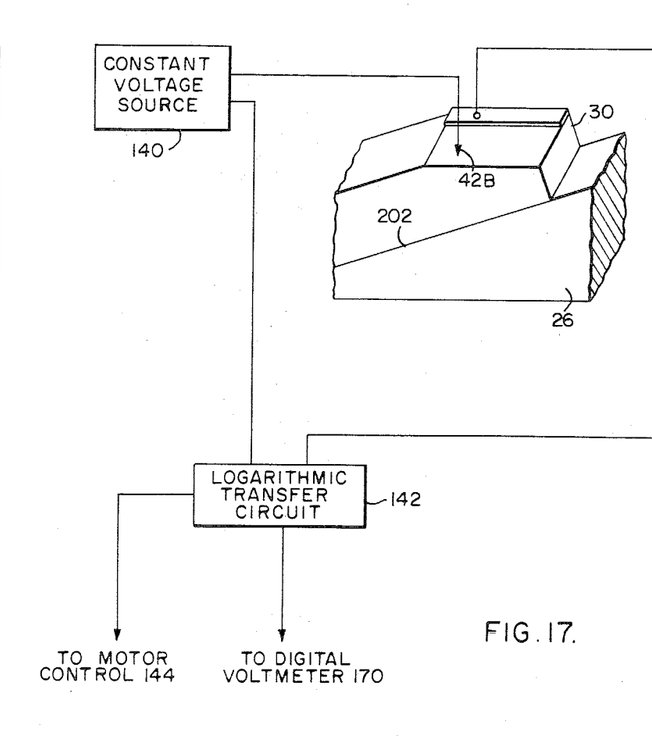

For increased clarity, one of the alternate embodiments above, including a large area ohmic contact affixed by suitable means to the lapped bevel surface 40 of the sample 30 is shown in FIG. 17 which configuration is applicable whether or not a PN-junction is present in the sample 30. The curves plotted from operation of the apparatus in this instance will be the same as, or very similar to, those previously described in the curves of FIGS. 8, 9 and 10.

Figures 18, 19, 20:
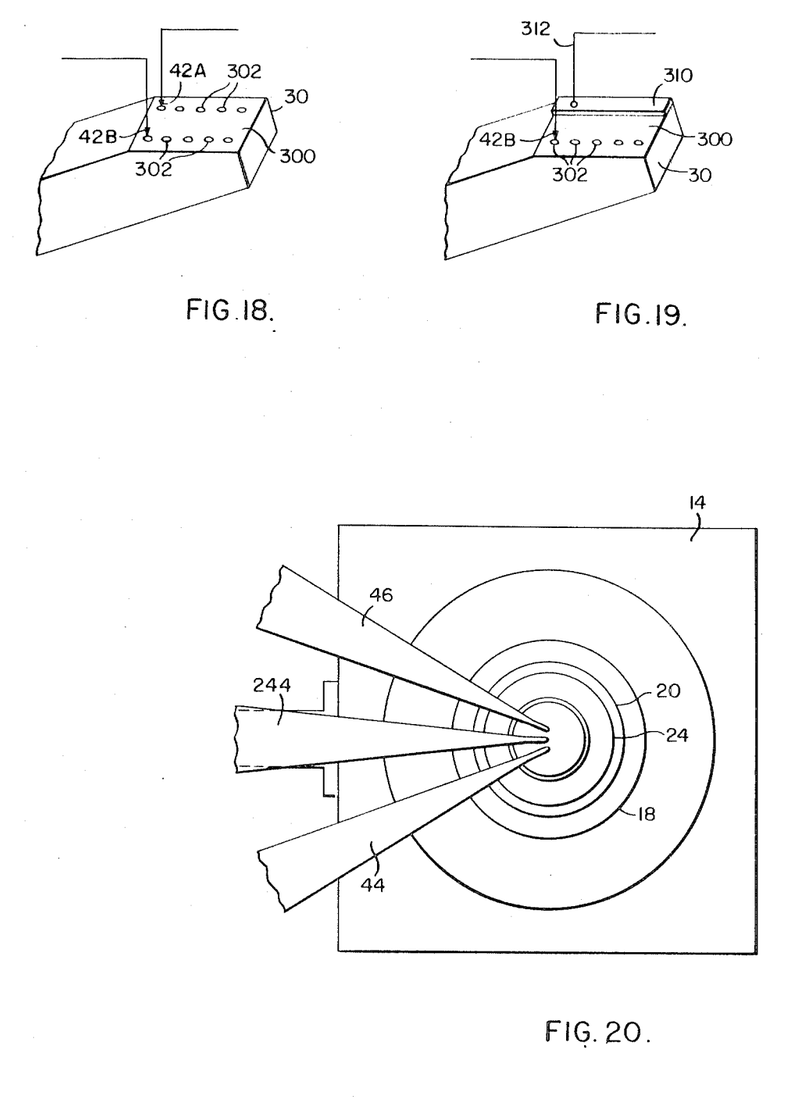

Some semiconductor materials such, for example, as gallium arsenide and gallium phosphide have inherent properties which preclude the making of metal-semiconductor pressure electrical contacts with the sample of material with sufficiently low potential barrier layers that the bulk semiconductor spreading resistance is measurable. Therefore, small area ohmic electrical contacts are formed on the surface of the sample of material which is to be probed by the apparatus of this invention. Referring now to FIG. 18, there is shown a suitably prepared sample 30 which is to be probed by members 42A and 42B across bevel surface 300. A plurality of small area ohmic electrical contacts 302 are formed on the surface 300 by such suitable means as metal evaporation and metal alloying or fusing techniques to provide the ohmic electrical contacts to the sample 30. The contacts 302 are spaced apart from each other equivalent to the stepping distance of the probes 42A and 42B when the apparatus of the invention is operated. The operation of the apparatus is exactly the same as before except the probes 42A and 42B make a pressure contact to the spaced small area ohmic electrical contacts 302. The measured spreading resistance of the material of the sample 30 is that resistance associated with the spaced small area electrical contacts 302.

With reference to FIG. 19, the spreading resistance of the sample 30 of FIG. 18 may be determined by a single probe such, for example, as by employing probe 42B and one set of the spaced contacts 302. The second set of contacts 302 is replaced by a large area contact 310 joined to surface 300 by the same means as contacts 302. Lead 312 is affixed to contact 310 replacing probe 42A and does not step in sequence with probe 42B but remains fixed in one location.

In making spreading resistance determination for any material sample probes 42A and 42B must be on the same side of the PN-junction if any are present in the sample 30. If sample 30 has one or more PN-junctions one stepping probe employed with a large area contact affixed to the same surface that the probe is stepping across may be utilized with the large area contact being continuous across one or more of the PN junctions.

Referring now to FIG. 20 there is shown an alternate embodiment of the apparatus of this invention. All components of the apparatus are the same except that three probes are employed In FIG. 20, the additional probe arm 244 has a probe (nor shown), the same as probes 42A and 42B and which functions in the same manner as shown. However, probe arm 244 is affixed to the platen 14 so that the probe of the arm 244 is in a fixed position with respect to the surface of the sample being probed during the motion of the sample relative to the other two probes 42A and 42B. The contact due to the probe of arm 244 results in a constant spreading resistance which may be subtracted from the total measured resistance with the data then being processed by the computer as described heretofore.

I claim as my invention:

1. In apparatus for measuring the resistance between two electrically conductive members in electrical contact with a semiconductor body and for determining from the resistance measurement the resistivity and impurity concentration in that volume of the semiconductor body beneath each conductive member in contact with the body, the combination of, mechanical means for placing at least two electrically conductive members in electrical contact with a first surface of the semiconductor body;

means for establishing a predetermined electrical potential between said electrically conductive members whereby an electrical current proportional to the electrical resistance of the semiconductor body will flow through the body between the members;

means electrically connected to said electrically conductive members for producing a first electrical signal which varies as a function of the resistance presented to said electrical current by the volume of the semiconductor body between each of said electrically conductive members;

logarithmic transfer circuit means responsive to said electrical signal, to produce a second electrical signal which is proportional to the resistivity and impurity concentration values for the material of said body between the electrically conductive members, and means responsive to said second type electrical signal for recording and storing said resistivity and impurity concentration values 2. The apparatus of claim 1 including means responsive to said electrical signal to produce a third electrical signal which varies as a function of the logarithm of actual resistance of the volume of semiconductor material beneath the electrically conductive members.

3. The apparatus of claim 2 in which said mechanical means includes means for elevating said at least one electrically conductive member off said surface of said semiconductor body;

means for moving said body beneath said at least one electrically conductive member through an incremental distance when said at least one electrically conductive member is elevated from said surface; and means for thereafter lowering said at least one electrically conductive member into an electrically conductive relationship with a new portion of said surface of said body of semiconductor material; and including means for producing a fourth type electrical signal which varies as a function of the movement of said body beneath said at least one electrically conductive member;

an X–Y recorder responsive to said fourth type electrical signal which varies as a function of movement and also responsive to said third type electrical signal which varies as a function of resistance for plotting the resistance values at spaced points along the body versus movement of the body; and means responsive to said fourth type electrical signal and a fifth type electrical signal, which fifth type signal varies as a function of the resistivity of the volume of semiconductor material beneath each of the conductive members, for plotting the resistivity values at spaced points along said semiconductor body versus movement of said body.

4. The apparatus of claim 3 in which said X–Y recorder means, responsive to said fourth type electrical signal, is also responsive to a sixth type electrical signal, which signal varies as a function of the impurity concentration of the semiconductor material between the electrically conductive members, said X–Y recorder plotting impurity concentration versus movement at spaced points on said semiconductor body 5. The apparatus of claim 1 including an electronic computer, said computer determining the resistivity value between spaced points of said semiconductor body and generating said fourth type electrical signal proportional to said resistivity.

6. The apparatus of claim 1 including an electronic computer, said computer determining the resistivity value between spaced points of said semiconductor body and generating said second type electrical signal proportional to said resistivity value.

7. The apparatus of claim 4 including an electronic computer which functions as the means for producing said second, third, fifth and sixth type electrical signals.

8. A process for determining and producing a profile of the electrical resistance in at least a portion of a body of semiconductor material comprising the steps of:

a. electrically contacting at least a first surface of a body of semiconductor material with at least one electrically conductive member in a predetermined sequential stepping electrical contacting procedure across the at least one surface;

b. establishing a predetermined electrical potential between said at least one electrically conductive member and a second electrically conductive member in electrical contact with a surface of said body each time said at least one electrically conductive member is in electrical contact with at least one surface during the predetermined sequential stepping electrical contacting procedure thereby inducing an electrical current to flow between the electrically conductive members;

c. determining the resistivity of the volume of semiconductor material of the body beneath each of the electrically conductive members;

d. electronically comparing the determined resistivity of the volume of semiconductor material with a program of approximate resistivities for the same semiconductor material; and e. producing a physical representation of the actual resistivity of the semiconductor material of the body between each of the two electrically conductive members.

9. The process of claim 8 including affixing a large area ohmic electrical contact to a surface of said body; and affixing the second electrically conductive member to said large area ohmic electrical contact prior to electrically contacting said at least a first surface with said at least one electrically conductive member.

10. The process of claim 9 including affixing the large area ohmic electrical contact to the first surface of the body 11. The process of claim 8 including the steps prior to establishing a predetermined electrical potential between the members of:
- affixing a pair of a plurality of pairs of ohmic electrical contacts to the first surface of the body at predetermined intervals, the distance between adjacent pairs of ohmic electrical contacts being equal to the distance said at least one electrically conductive member is predetermined sequentially stepped; and
- electrically contacting each ohmic electrical contact of each pair of plurality of ohmic electrical contacts simultaneously with two electrically conductive members in a predetermined sequential stepping electrical contacting procedure across the first surface of the body.

12. The process of claim 9 including the steps prior to establishing a predetermined electrical potential between the members of;
- affixing a plurality of ohmic electrical contacts to the first surface of the body at predetermined intervals, the distance between adjacent ohmic electrical contacts being equal to the distance said at least one electrically conductive member is predeterminately sequentially stepped; and
- electrically contacting each ohmic electrical contact of the plurality of ohmic electrical contacts in a predetermined sequential stepping electrical contacting procedure across the first surface of the body.

* * * * *